United States Patent [19]

Kruskal et al.

[11] Patent Number: 5,918,052
[45] Date of Patent: Jun. 29, 1999

[54] MULTIPLE INHERITANCE MECHANISM FOR AN OBJECT ORIENTED PROGRAMMING ENVIRONMENT

[75] Inventors: Vincent Joseph Kruskal, Harrison; Ashok Malhotra, Croton-On-Hudson, both of N.Y.; Steven Jay Munroe, Rochester, Minn.

[73] Assignee: International Business Machines Corporation, Armonk, N.Y.

[21] Appl. No.: 08/341,333

[22] Filed: Nov. 16, 1994

Related U.S. Application Data

[63] Continuation of application No. 07/975,347, Nov. 12, 1992, abandoned.

[51] Int. Cl.⁶ .................................................. G06F 9/40
[52] U.S. Cl. ........................................................ 395/701
[58] Field of Search .................................... 395/705, 701, 395/702, 680, 683

[56] References Cited

U.S. PATENT DOCUMENTS

| | | | |
|---|---|---|---|
| 5,075,848 | 12/1991 | Lai et al. | 395/425 |
| 5,119,475 | 6/1992 | Smith et al. | 395/156 |
| 5,187,786 | 2/1993 | Densmore et al. | 395/600 |
| 5,237,654 | 8/1993 | Shackelford et al. | 395/650 |
| 5,247,651 | 9/1993 | Clarine | 395/500 |
| 5,247,669 | 9/1993 | Abraham et al. | 395/614 |
| 5,291,583 | 3/1994 | Bapat | 395/500 |
| 5,297,284 | 3/1994 | Jones et al. | 395/705 |
| 5,313,630 | 5/1994 | Namioka et al. | 395/614 |
| 5,313,633 | 5/1994 | Tomita et al. | 395/601 |
| 5,404,525 | 4/1995 | Endicott et al. | 395/702 |
| 5,768,588 | 6/1998 | Endicott et al. | 395/683 |
| 5,774,723 | 6/1998 | Endicott et al. | 395/702 |

OTHER PUBLICATIONS

Korson, Tim; McGregor, John D., "Understanding object-oriented: a unifying paradigm", Communications of the ACM, v33, n9, p40(21), Sep. 1990.

*Primary Examiner*—Alvin E. Oberley
*Assistant Examiner*—St. John Courtenay, III
*Attorney, Agent, or Firm*—Steven W. Roth

[57] ABSTRACT

The data structures, apparatus, methods, and mechanisms of the present invention cooperate to provide the user with a flexible multiple inheritance OOP environment. OOP environments comprise composite data structures and internal mechanisms for manipulating those structures. The structures are used to allow a user to realize the power of OOP. Hence, the layout of these structures, the way in which the structures inter-relate, and the manner in which they are built and used are all critical to the utility of a particular OOP environment. It is no surprise, then, that manufacturers and suppliers of OOP environments are constantly striving to design composite data structures and internal mechanisms which maximize user productivity. The composite data structures and organization of the MOM OOP environment provide significant benefits that are not provided by the multiple inheritance environments of the prior art. Of particular significance is the ability to add method programs to a class definition without the need to recompile the majority of the code base.

18 Claims, 16 Drawing Sheets

Creating the MOM Multiple Inheritance Environment

C++ (PRIOR ART)

MULTIPLE INHERITANCE MECHANISM FOR AN OBJECT ORIENTED PROGRAMMING ENVIRONMENT

This application is a continuation of application Ser. No. 07/975,347, filed Nov. 12, 1992, now abandoned.

FIELD OF THE INVENTION

This invention relates to the data processing field. More specifically, this invention relates to Object Oriented Programming environments.

BACKGROUND OF THE INVENTION

The development of the EDVAC computer system of 1948 is often cited as the beginning of the computer era. Since that time, computer systems have found their way into just about every aspect of the American life style. One reason for this proliferation is the ability of computer systems to perform a variety of tasks in an efficient manner. The mechanisms used by computer systems to perform these tasks are called computer programs.

Like computer systems themselves, the development of computer programs has evolved over the years. The EDVAC system used what was called a "one address" computer programming language. This language allowed for only the most rudimentary computer programs. By the early 1950s, scientists had developed mechanisms which could convert symbolic instructions that were reasonably understandable to humans into a form which could be understood by a computer system. Each computer system was designed to handle a specific group of these instructions. These groups of instructions are called instruction sets.

The next step in the development of computer programs was the notion of computer programming languages. Computer programming languages were even more understandable than symbolic instruction sets. Computer programs are written using a variety of computer programming languages. Once written, a computer program is compiled into instructions that are part of the instruction set of a particular computer system. FORTRAN is usually cited as one of the first languages to allow computer programs to be written independently of a particular instruction set. By the 1960s, improvements in computer programming languages led to computer programs that were so large and complex that it was difficult to manage and control their development and maintenance.

Hence, in the 1970s, focus was directed away from developing new programming languages towards the development of programming methodologies and environments which could better accommodate the increasing complexity and cost of large computer programs. One such methodology is the Object Oriented Programming (OOP) approach. OOP advocates claim that this approach to computer programming can improve the productivity of computer programmers by as much as twenty-five fold. Hence, while it has been some time since the OOP concept was originally developed, it is currently seen as the way of the future.

Three of the more fundamental concepts of OOP are "encapsulation" "inheritance," and "reusability." Encapsulation means that information and the means for using the information are conceptually packaged into individual entities called "objects." The information contained in an object is called data and the means used to perform a particular operation upon the information is called a method. The objects represent individual operations or groups of operations that can be performed by a computer system. The idea of reusability is that the objects are made sufficiently generic so that they can be used by the methods of many other objects. Any program or method program that uses an object is said to be a client of that object (i.e., a client program). The client will call or invoke the object while specifying the method that is to be used.

Objects are also considered to be members of a particular "class" of objects. When objects are created they may be members of a particular class or they may be considered to be members of a subclass of a particular class. Objects that are created as members of a subclass are said to have "inherited" the characteristics (i.e., the data and methods) of the class to which they are a subclass (i.e., their super class). For example, consider a class of objects called Vehicle. The class will have data that describes objects of that class (i.e., name, color, weight, owner, etc.) The class will also have methods defined which can be used to work with the data of the class. A subclass of class Vehicle, class RoadVehicle, could further refine class Vehicle to include data that indicated what type of Vehicle was involved (e.g., by adding attributes such as number-of-wheels). Similarly, a class called WaterVehicle could refine class Vehicle to include attributes such as displacement and draft. Now, for example, a object of class RoadVehicle could be created that had name Boomer, color Red, Weight 4000 lbs and owner Steve. Similarly, we could create objects of class WaterVehicle which represented specific boats. As subclasses are added, a hierarchical tree structure is created. Each class, be it respectively referred to as a subclass or super class, is considered to be at a certain level in the hierarchical structure. In the example, class RoadVehicle and class WaterVehicle, as subclasses of class Vehicle, would be at a level one greater than that of class Vehicle.

The notion of inheritance can be extended to include what is called "multiple inheritance." Multiple inheritance occurs when an class is created as the subclass of more than one class. Since the class inherits the characteristics from more than one class, objects of that class can be considered to be members of two or more classes at the same time. For example, consider the problem of representing an AquaTank in the example above AquaTanks are special Army vehicles that can run on the road, like Tanks and in the water like boats. Since an AquaTank is both a RoadVehicle and a WaterVehicle, we create a class, called AmphibiousVehicle that inherits from (is a sub class of) both RoadVehicle and WaterVehicle. This new class would have data about number-of-wheels as well as draft and displacement and may have additional special data as well. Objects of class AmphibiousVehicle will, thus, inherit the characteristics of both classes. As stated, this is called "multiple inheritance."

With single inheritance, the classes make up an inheritance tree. By adding multiple inheritance, the tree structure is generalized to a graph. FIG. 2A shows an inheritance graph.

Of the two most well known OOP environments, the "C++" environment and the "Smalltalk" environments, only the C++environment supports multiple inheritance. The C++environment is merely an extension to the existing "C" computer programming language. Hence, its approach to multiple inheritance, and to OOP in general, is extremely inflexible. Whenever data for a particular class of objects requires a change or whenever a method for a particular class of objects is to be added, all of the objects that are members of the changed class and all of the objects that are members of subclasses of the changed class must be recreated and their methods must be recompiled. Further, clients that depend upon objects of the changed class or upon objects which are members of a subclass of the changed class, must also be recompiled. While this may not seem particularly troublesome for the hypothetical example presented above, it is extremely costly and time consuming for large systems that include many classes and subclasses.

Essentially, then, the OOP environments of today greatly reduce the productivity advantages that were to be realized by the OOP approach.

SUMMARY OF THE INVENTION

It is a principle object of this invention to provide an enhanced OOP environment that supports multiple inheritance.

It is another object of this invention to provide a method and apparatus for generating and storing the structures of an enhanced, multiple inheritance OOP environment.

It is still another object of this invention to provide a method and apparatus for routing on a multiple inheritance object of an enhanced OOP environment.

It is yet another object of this invention to provide a method and apparatus for creating an enhanced, multiple inheritance OOP environment.

These and other objects are accomplished by the multiple inheritance OOP data structures, apparatus, methods, and mechanisms disclosed herein. The data structures, apparatus, methods, and mechanisms of the present invention cooperate to provide the user with a flexible multiple inheritance OOP environment.

OOP environments comprise composite data structures and internal mechanisms for manipulating those structures. The structures are used to allow a user to realize the power of OOP. Hence, the layout of these structures, the way in which the structures inter-relate, and the manner in which they are built and used are all critical to the utility of a particular OOP environment. It is no surprise, then, that manufacturers and suppliers of OOP environments are constantly striving to design composite data structures and internal mechanisms which maximize user productivity.

The internal mechanisms and structures that make up the present invention are collectively referred to as the Multiple Inheritance Object Model (MOM). The composite data structures and organization of the MOM OOP environment provide significant benefits that are not provided by the multiple inheritance environments of the prior art. Of particular significance is the ability to add method programs to a class definition without the need to recompile the majority of the code base.

The MOM environment comprises three key composite data structures: the object structure, the interface table, and the method table. The object structure, which is similar in nature to existing OOP object structures, contains the data that characterizes the object and location information about the interface table. The object data is further broken down by class-level. Hence, each object contains as many sets of data as its class is deep in the particular hierarchical tree structure. The interface table contains an interface table entry for the class to which the object belongs and entries for each of the object's super classes (i.e., one entry for each level the class is deep in the particular hierarchical tree structure). Each entry contains location information about the method table for the subject class-level and an offset for the object data associated with that particular class-level. The location information is used to gain access to the method table, while the offset is used to gain access to the instance data stored in the object. The method table for a particular class level contains method table entries which themselves contain location information about individual method programs and method signatures. Method signatures specifically identify particular method programs.

To provide multiple inheritance, the MOM interface tables also include link pointers which are used to link multiple interface tables (i.e., class structures) together so that a particular object instance can inherit characteristics from multiple classes.

When a client program intends to make use of a function embodied in a particular object, it calls the object by specifying the object name and the name of the method program that is to be invoked. Calling an object is also referred to as "routing on" the object. When compiled, the MOM call statement comprises four pieces of information: an object ID, a level, a call signature, and a method offset (i.e., the location of a method program within a method table). The object ID is used to locate and access the particular object. Once accomplished, the location information within the object is used to gain access to the interface table. The level is then used to locate the appropriate interface table entry. The method table location information contained in the interface table entry is used to gain access to the appropriate method table. The method offset is then used to access the correct method table entry and compare the call signature with the method program signature. If the signatures match, the location information is used to invoke the method program.

If the call signature does not match the method program signature, the MOM method resolution apparatus automatically loads the link pointer and determines whether an additional interface table is connected to the initial interface table (i.e., whether this particular object has inherited characteristics from multiple classes). If so, the method resolution mechanism once again uses the level, method offset, and call signature to attempt to invoke the selected method program. This process continues until the appropriate method program is located or there are no more interface tables. When the latter occurs, the MOM method resolution mechanism raises an error condition and returns such to the caller.

If it becomes necessary to add an additional method program to a particular class, the computer programmer need only add another entry to the method table associated with that particular class. No recompilation of objects is required. Further, only those client programs that need access to the new method program will require recompilation.

In addition, the MOM environment provides internal mechanisms which support its composite data structures. These include an object manager which supports the creation of object instances that inherit characteristics from multiple classes.

DESCRIPTION OF THE PREFERRED EMBODIMENT

As mentioned above, existing multiple inheritance OOP environments do not provide for the ability to add method programs or data to existing object and class structures without recompilation. A flexible approach for adding data and method programs to classes of a non-multiple inheritance OOP environment is set forth in co-pending, commonly assigned patent application Ser. No. 07/954,138 filed on Sep. 31, 1992, now U.S. Pat. No. 5,404,525, Co-pending patent application Ser. No. 07/954,138 is incorporated by reference herein.

Figure 1:
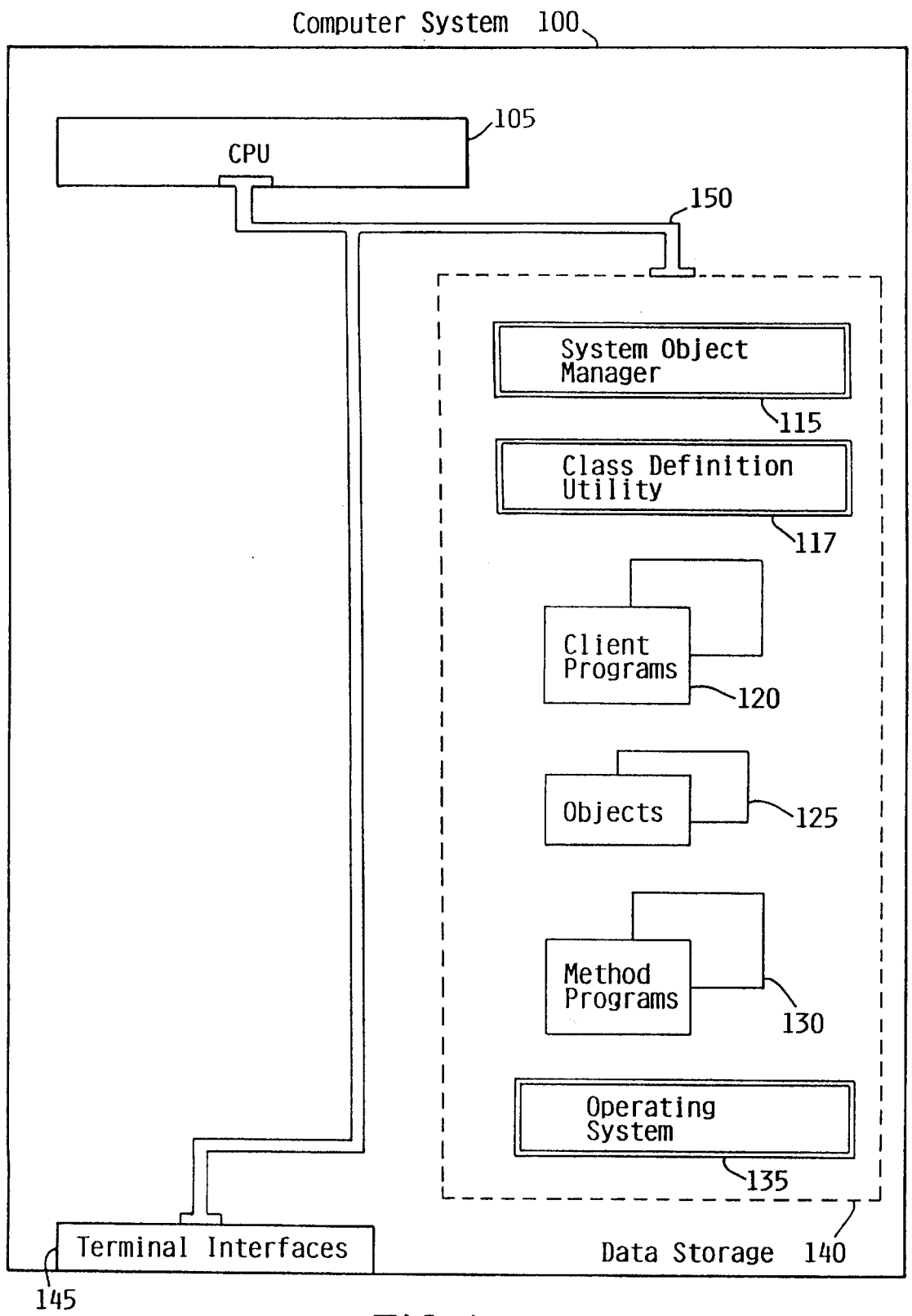
FIG. 1 shows the computer system of the preferred embodiment.

FIG. 1 shows a block diagram of the computer system of the present invention. The computer system of the preferred embodiment is an enhanced IBM AS/400 mid-range computer system. However, any computer system that is capable of supporting an OOP environment could be used. As shown in the exploded view of FIG. 1, computer system 100 comprises main or central processing unit (CPU) 105 connected to data storage 140 and terminal interface 145 via system bus 150. Terminal interface 145 allows system administrators and computer programmers to communicate with computer system 100, normally through programmable workstations. Although the system depicted in FIG. 1 contains only a single main CPU and a single system bus, it should be understood that the present invention applies equally to computer systems having multiple main CPUs and multiple I/O buses. Similarly, although the bus of the preferred embodiment is a typical hardwired, multidrop bus, any connection means that supports bi-directional communication could be used.

Data storage 140 contains system object manager 115, class definition utility 117, client programs 120, objects 125, method programs 130, and operating system 135. While data storage 140 is shown as a monolithic entity, it should be understood that it may comprise a variety of devices, and that all programs and files shown will not necessarily be contained in any one device. For example, portions of client programs 120 and operating system 135 will typically be loaded into primary memory to execute, while source data files will typically be stored on magnetic or optical disk storage devices.

Figure 2A:
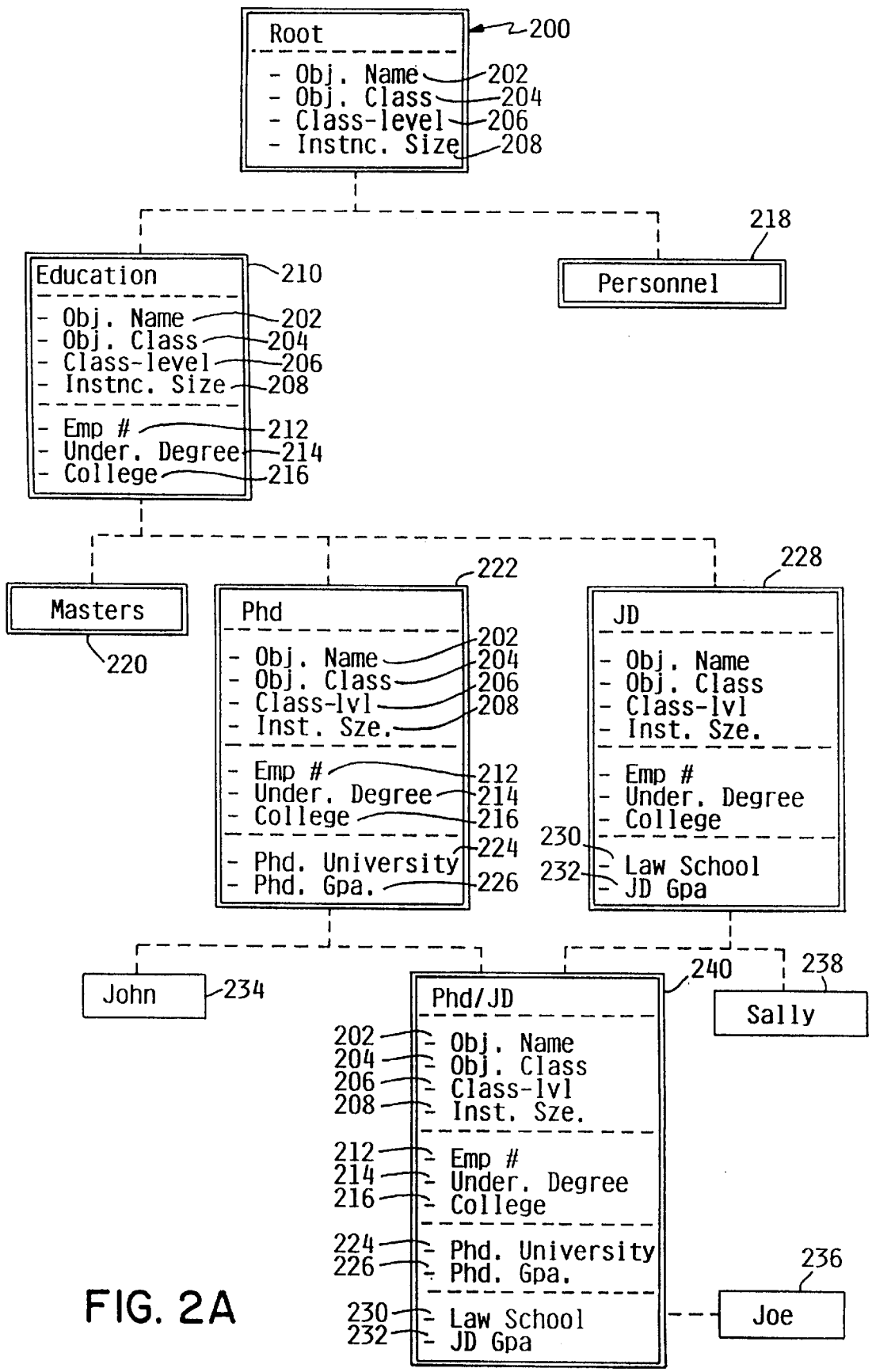
FIG. 2A shows a hypothetical, multiple inheritance OOP configuration that will be used to explain the OOP environment of the present invention.

FIG. 2A shows an example OOP hierarchical configuration that is used throughout this specification to explain the apparatus, methods, and structure of the present invention. Double lined boxes represent different classes, while single lined boxes represent object instances of a particular class. Object instances represent members of a particular class. It should also be understood that FIG. 2A is a conceptual representation of a hypothetical configuration. The way in which classes and objects actually exist in data storage 140 is described in FIGS. 4A–4D and 7A. It should be further understood that, at the conceptual level, the hypothetical configuration of FIG. 2A represents a way in which an individual or a user would organize data dealing with particular persons or employees. Each class can be thought of as a particular category of information and each subclass can be thought of as a subcategory of information. The individual members of a particular class (as represented by object instances) contain information about particular individuals.

Class "Root" 200 is the base class for the example tree structure. Class Root 200 comprises instance variables: "object name" 202, "object class" 204, "class-level" 206, and "instance size" 208. Since class Root 200 is at the highest level of the tree structure, its instance variables will be inherited by all of the subclasses that are defined below it (not shown for class Personnel 218). Class Root 200 should also be considered to be defined at class-level 0. At class-level 1, classes Education 210 and Personnel 218 have been defined. Class Education 210 comprises object instance variables: "object name" 202, "object class" 204, "class-level" 206, "instance size" 208, "employee number" 212, "undergraduate degree" 214, and "college" 216. Object instance variables "object name" 202, "object class" 204, "class-level" 206, and "instance size" 208 have been inherited from class Root and object instance variables "employee number" 212, "undergraduate degree" 214, and "college" 216 have been specifically defined for class Education. Each class which is defined as a subclass of class Education (i.e., classes Masters 220, PhD 222, and JD 228) will inherit the definitions for all of these object instances variables (not shown for class Masters 220).

For example, class PhD 222 has been defined as a subclass of class Education 210. Class Education 210 is itself a subclass of class Root 200. Hence, class PhD 222 will inherit the object instance variable definitions of both of its super classes (i.e., "object name" 202, "object class" 204, "class-level" 206, "instance size" 208, "employee number" 212, "undergraduate degree" 214 and "college" 216). Class PhD 222 also contains instance variables that are part of its individual class definition. These are: "PhD university" 224 and "PhD Gpa" 226. Any objects that are created as members of class PhD 224 will have values associated with the object instance variables object name, object class, class-level, instance size, employee number, undergraduate degree, college, PhD university, and PhD Gpa. John 234 is an example of an object that is a member of class PhD 222 and Sally 238 is an example of an object that is a member of class JD 228.

Class PhD/JD 240 is shown as a multiple inheritance class. This means that class PhD/JD inherits its characteristics from more than one super class at a particular level in the structure. In this example class PhD/JD 240 inherits its characteristics from class PhD 222 and class JD 228 which are both at level 2 in the structure. While the example used shows that class PhD/JD 240 inherits characteristics from two classes which are only one level above it in the hierarchy, it should be understood that the present invention applies equally to multiple inheritance that occurs from classes at any level in the hierarchy. It should be further understood that the present invention is not limited to inheritance from two super classes. The invention applies equally to inheritance from any number of super classes at any number of levels.

Since class PhD/JD 240 has been defined as a subclass of classes PhD 222 and JD 238, class PhD/JD 240 will inherit the common characteristics of both (i.e., "object name" 202, "object class" 204, "class-level" 206, "instance size" 208, "employee number" 212, "undergraduate degree" 214 and "college" 216), the characteristics particular to class PhD 222 (i.e., "PhD University" 224 and "PhD Gpa" 226) and the characteristics particular to class JD 228 (i.e., "Law School" 230 and "JD Gpa" 232). It should also be noted that while FIG. 2A does not show instance variable definitions that are specifically defined for class PhD/JD 240, such is possible within the scope of the present invention.

Object instance Joe 236 is an example of an object that is a member of class PhD/JD.

THE MOM INTERFACE TABLES

Figure 2B:
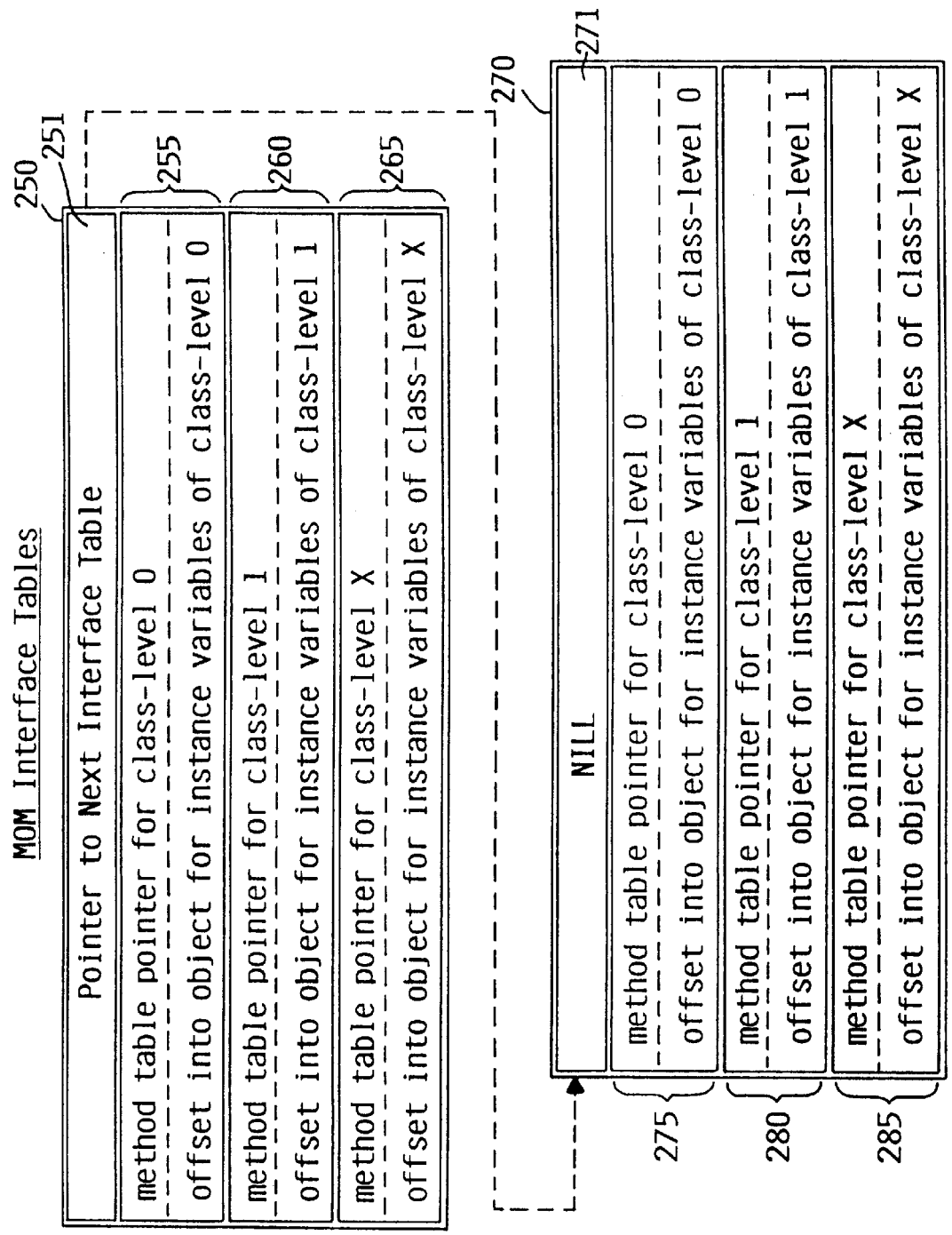
FIG. 2B shows a detailed diagram of the MOM interface tables.

Since understanding how the MOM interface tables provide for multiple inheritance is critical to the understanding of the present invention, its details are set out in FIG. 2B. Each entry within an interface table contains information about a particular class in a hierarchy. More specifically, each entry contains location information about either an additional interface table or the method programs and instance data of a particular class. When client programs call an object, they gain access to additional interface tables and the method programs and instance data via the location information stored in the interface table.

MOM interface table 250 comprises interface table entries 251, 255, 260, and 265, while interface table 270 comprises interface table entries 271, 275, 280, and 285. Interface table entries 251 and 271 are used to store location information about example, interface tables. For example, FIG. 2B shows that interface table 270 can be located through the location information contained in interface table entry 251. Interface table entries 255, 260, 265, 275, 280, and 285 comprise a method table pointer (e.g., method table pointer 252) and a data offset (e.g., data offset 255). Method table pointers are used by client programs to access particular method tables and eventually method programs. These fields are explained in more detail in the text accompanying FIGS. 7A and 7B.

CREATING THE MOM ENVIRONMENT

Figure 3A:
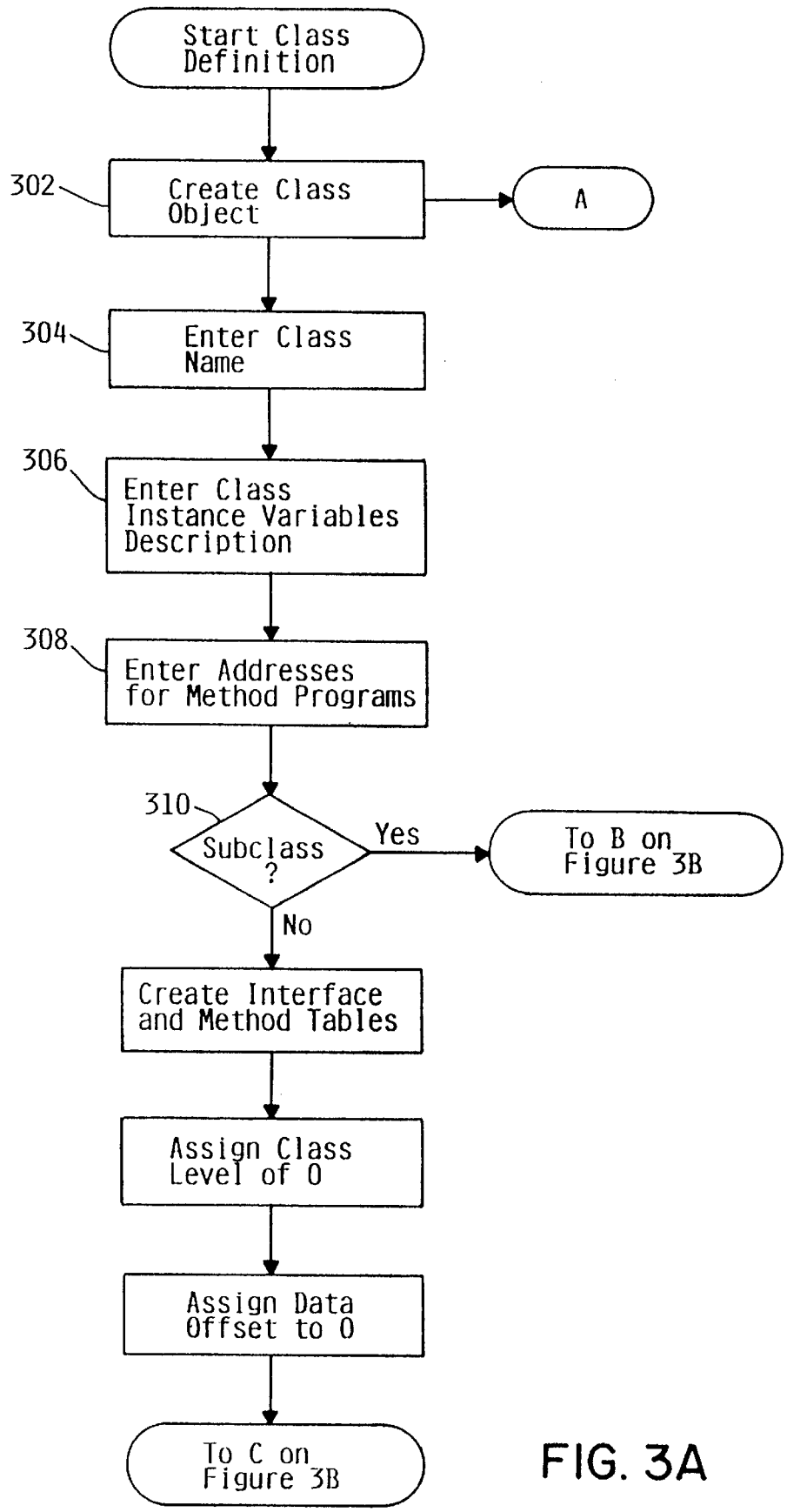
FIGS. 3A through 3C are flow diagrams that show how a MOM OOP environment is created.
Figures 1, 3B:
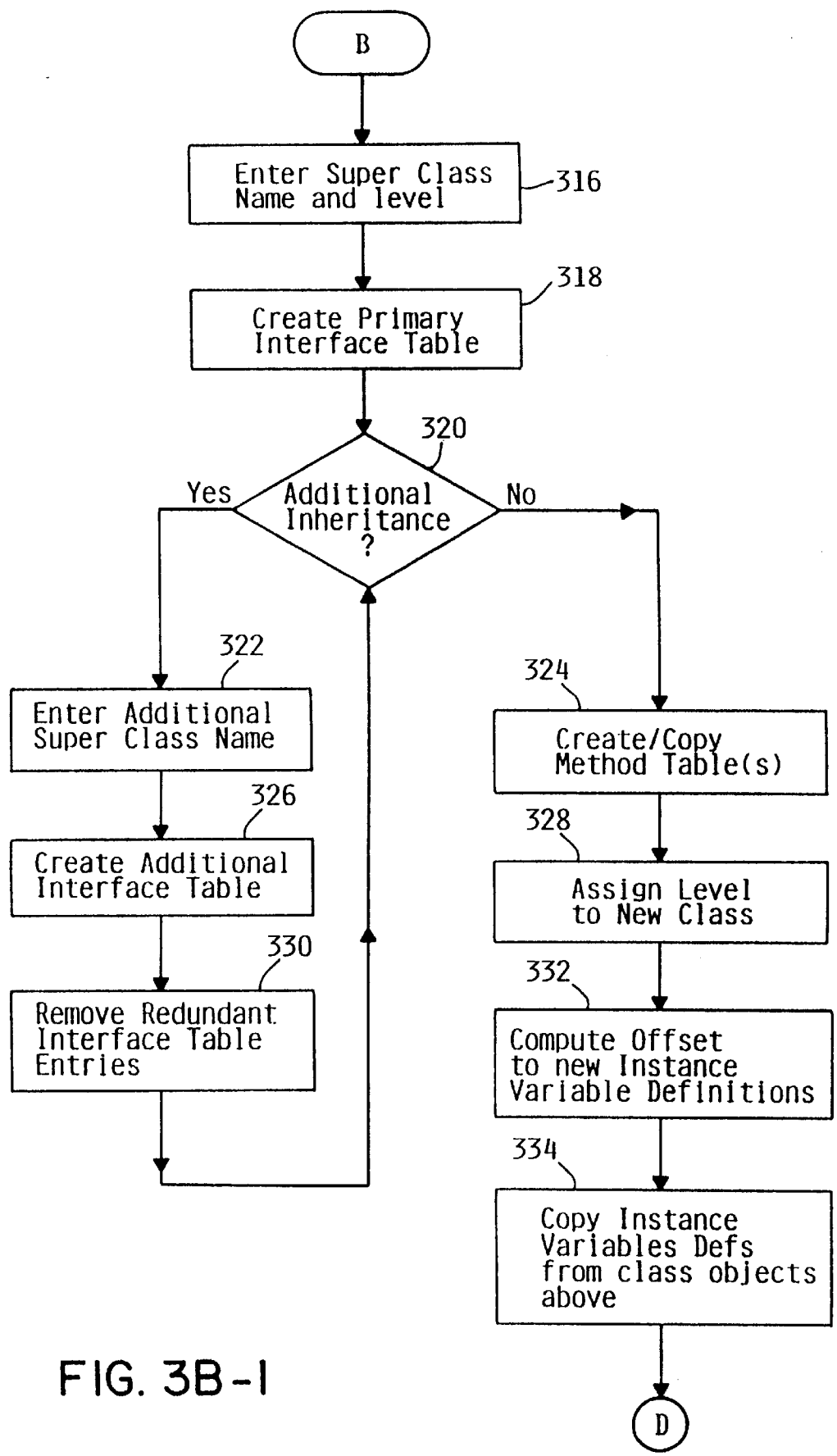
Figures 2, 3B:
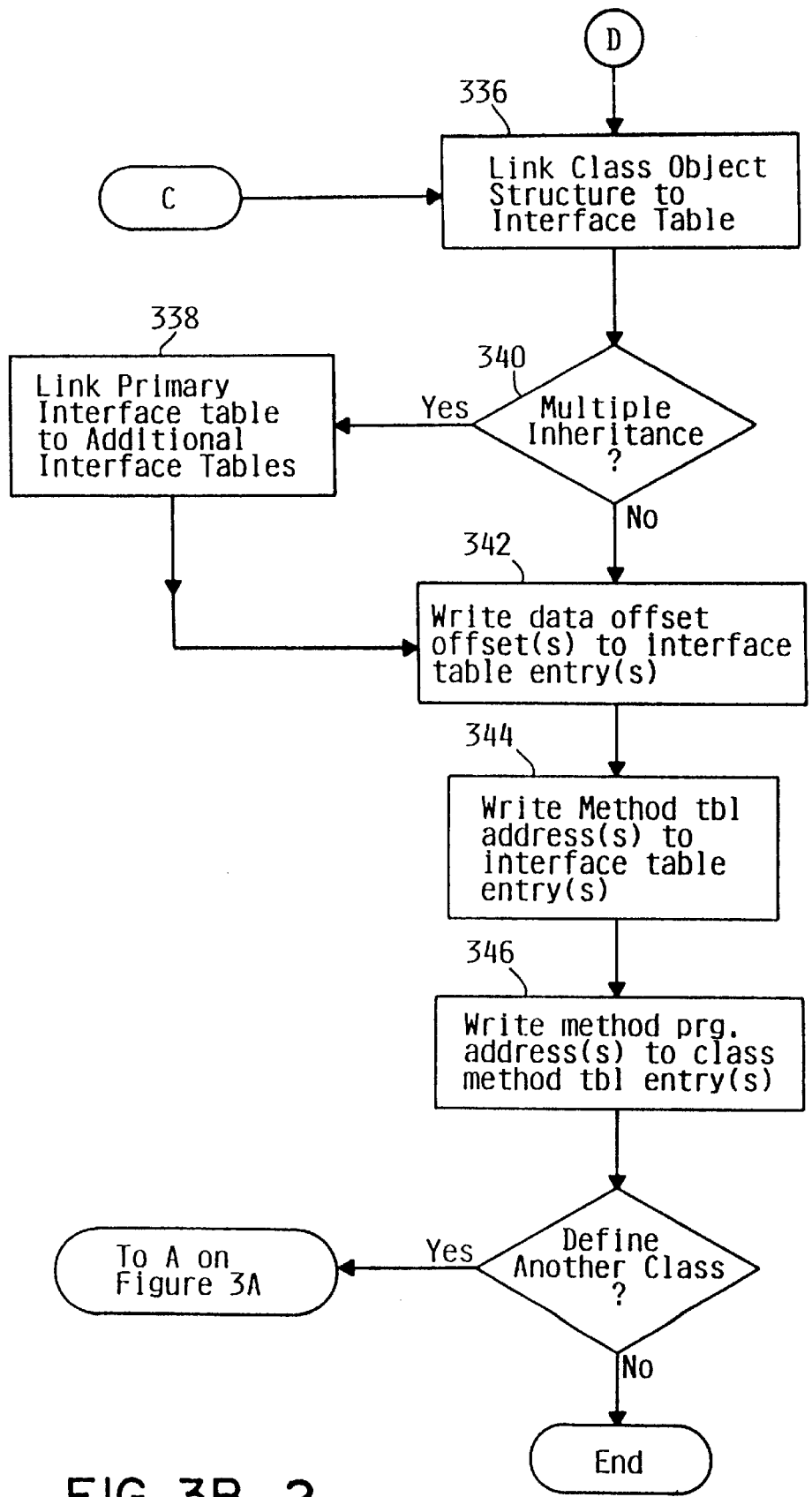
Figure 3C:
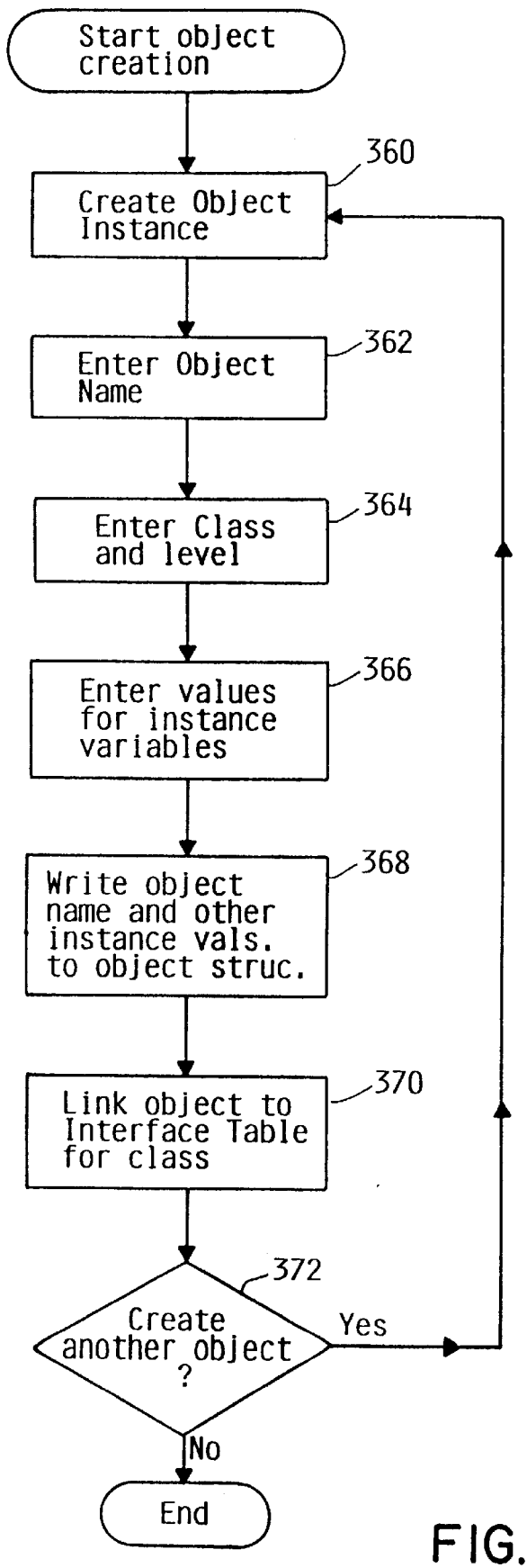

FIG. 3A is a flow diagram of the inner workings of class definition utility 117 and FIG. 3B is a flow diagram the inner workings of system object manager 115. FIGS. 4A through 4D show how a portion of the tree structure of FIG. 2 would actually exist in data storage 140. FIGS. 3A through 3C are used in conjunction with FIGS. 4A through 4D to explain how a hierarchical configuration such as that shown in FIG. 2 is actually created.

When computer system 100 is shipped to a customer or other user, the composite data structures for class object Root (400 on FIG. 4A) and the Root class (structures 405 and 410 on FIG. 4A) will have already been loaded into data storage 140. It will be understood by those skilled in the art that there is a plethora of ways in which these composite data structures could be initially generated and stored in data storage 140. Similarly, the generation and storage of these structures need not necessarily take place at the factory. A customer or user could also create and store these composite data structures through independent invocation of class definition utility 117 and system object manager 115. For the purposes of this explanation, however, it will be assumed that class object Root 400, interface table 405 (i.e., the interface table for class Root), and method table 410 (i.e., the method table for class Root) have been pre-loaded into data storage 140 at the factory.

When a user of computer system 100 wishes to define class Education 210, he or she will initiate a client program (i.e., one of client programs 120) which itself will call a method of class object Root 400. The client program thereby gains access to interface table 405 and method table 410. A complete explanation of how this access is actually performed is provided by FIGS. 7A and 7B and the accompanying text. Once access to method table 410 is accomplished, the client program will invoke class definition utility 117 through the use of define_subclass_p 412.

Class definition utility 117 is in reality a method program not unlike those of method programs 130. Class definition utility 117 receives increased treatment herein because of the role that it plays in the definition of classes. Flow diagram 3A shows that the first step performed by class definition utility 117 is to create the appropriate class object 302. In this case, the class object created will be class object Education 415 (shown on FIG. 4B). The user is then asked to enter the class name 304, instance variable definitions for the class (shown at 419 of FIG. 4B) 306, and method program addresses 308.

Class definition utility 117 will then ask the user whether the class to be defined is to be a subclass 310. Since in this example class Education is a subclass of class Root, this question will be answered in the affirmative. Referring now to FIG. 3B, the user will next be prompted for the name and level of the super class for the class to be defined 316. The name and level must both be specified to ensure that a unique super class is identified. In this example, the super class entered will be Root and the level entered will be zero. Once the super class name and level have been entered, class definition utility 117 creates the primary interface table 318. If multiple inheritance were involved the primary interface table will be the first interface table in a chain of interface tables (See FIG. 2B). Since class Education does not inherit from multiple classes (block 320), class definition utility 117 proceeds to create the method table for class Education and copy the method tables from the superclass(es) of class Education (here, super class Root) 324. These structures are respectively shown on FIG. 4B as interface table 420 and method tables 425 and 430. The new class (i.e., Education) will then be assigned a class-level (1 in this case) 328. In block 332, class definition utility 117 will compute the offset of the instance variable definitions entered by the user in block 306. In block 334, class definition utility 117 will copy the instance variables from class object Root (class object 400) and place them into the Education class object (class object 415). This is shown at 418 of FIG. 4B.

The next step is to link class object 415 to interface table 420 (block 336). This is accomplished by setting interface_tbl_p 417 equal to the starting address of interface table 420. Since multiple inheritance is not involved 340, class definition utility 117 will write the offsets of the class instance variables into the appropriate interface table entries in interface table 420 (block 342). The offset for the Education class instance variable definitions will be written into the Ed_instance_data_o field of interface table entry 423 and the offset for the super class instance variable definitions will be written into the rt_instance_data_o field of interface table entry 421. Lastly, the method table and method program addresses will be written to the interface and method tables respectively (blocks 344 and 346). The address for method table 425 will be written to the Ed_meth_tbl_p field of interface table entry 423 and the address for method table 480 will be written to interface table entry 412. In block 346, the addresses for the method programs will next be written into method table 425. For example, the address for a method program called "update undergraduate degree" will be written into "update_U_degree_p" field 427.

As with class Education, the next subclasses shown in the tree structure of FIG. 2A, PhD and JD, do not inherit characteristics from multiple super classes. FIG. 3A can be used in connection with FIG. 4C to understand how these subclasses would be defined. To avoid repetition, the details of the steps taken to define these subclasses will be omitted.

Since class PhD/JD inherits characteristics from both class PhD and class JD, its definition is different than that of classes Education, PhD, and JD. As above, the initiation of class definition utility 117 takes place when a client program routes on class object Root 400. Flow diagram 3A shows that the first step performed by class definition utility 117 is to create the appropriate class object 302. In this case, the class object created will be class object PhD/JD 470 (shown on FIG. 4D). The user is then asked to enter the class name 304, instance variable definitions for the class 306, and method program addresses 308. In this case, class PhD/JD has no instance variable definitions that are specific to it.

Class definition utility 117 will then ask the user whether the class to be defined is to be a subclass 310. Since in this example class PhD/JD is a subclass of class PhD and class JD, this question will be answered in the affirmative. Referring now to FIG. 3B, the user will next be prompted for the name and level of the super class for the class to be defined 316. The name(s) and level must both be specified to ensure that a unique super class is identified. In this example, the super class entered could be either PhD or JD and the level entered will be two. Once the initial super class name and level have been entered, class definition utility 117 creates the primary interface table 318 (shown on FIG. 4D as interface table 475). Since in this case multiple inheritance is involved, the primary interface table will be the first interface table in a chain of interface tables (See FIG. 2B). Class definition utility 117 then prompts the user for the entry of the additional super class name 322 and creates an additional interface table 326 (shown on FIG. 4D as interface table 480). Since most of the interface table entries in the interface tables will be identical, class definition utility 117 removes the redundant entries 330.

The user is then again asked whether additional inheritance is sought 320. While in this example call PhD/JD inherits characteristics from only two super classes at level 2, it will be recognized by those skilled in the art that the present invention applies to inheritance from any number of super classes that exist at the same level or at different levels. Having completed the creation of multiple interface tables, class definition utility 117 proceeds to create the method table for class PhD/JD and copy the method tables from the superclasses of class PhD/JD (here, super classes Root, Education, PhD, and JD) 324. The new class (i.e., PhD/JD) will then be assigned a class-level (i.e., one greater than the deepest super class—3 in this case) 328. In block 332, class definition utility 117 will compute the offset of the instance variable definitions entered by the user in block 306 (none were entered in this case). In block 334, class definition utility 117 will copy the instance variable definitions from class object Root (class object 400) and place them into the PhD/JD class object (class object 470). This is shown at 472 of FIG. 4B.

The next step is to link class object 470 to interface table 475 (block 336). This is accomplished by setting interface_tbl_p 473 equal to the starting address of interface table 475. Since multiple inheritance is involved 340, class definition utility 117 will first link primary interface table 475 to additional interface table 480 (block 338) and then write the offsets of the class instance variables into the appropriate interface table entries in interface tables 475 and 480 (block 342). Lastly, the method table and method program addresses will be written to the interface and method tables respectively (blocks 344 and 346).

The last step in constructing the example configuration of FIG. 2A, will be to create object instances that are members of a particular class. Similar to the discussion of the invocation of subclass definition utility 117, a user of computer system 100 that wishes to create an object instance of class PhD/JD will gain access to interface table 475 and the method table copied from class Root. A complete explanation of how this access is actually performed is provided by FIGS. 7A and 7B and the accompanying text. Once access to method table 475 is accomplished, the client program will invoke system object manager 115 through the use of create_new_object_p 442 (shown on FIG. 4A).

Figure 4A:
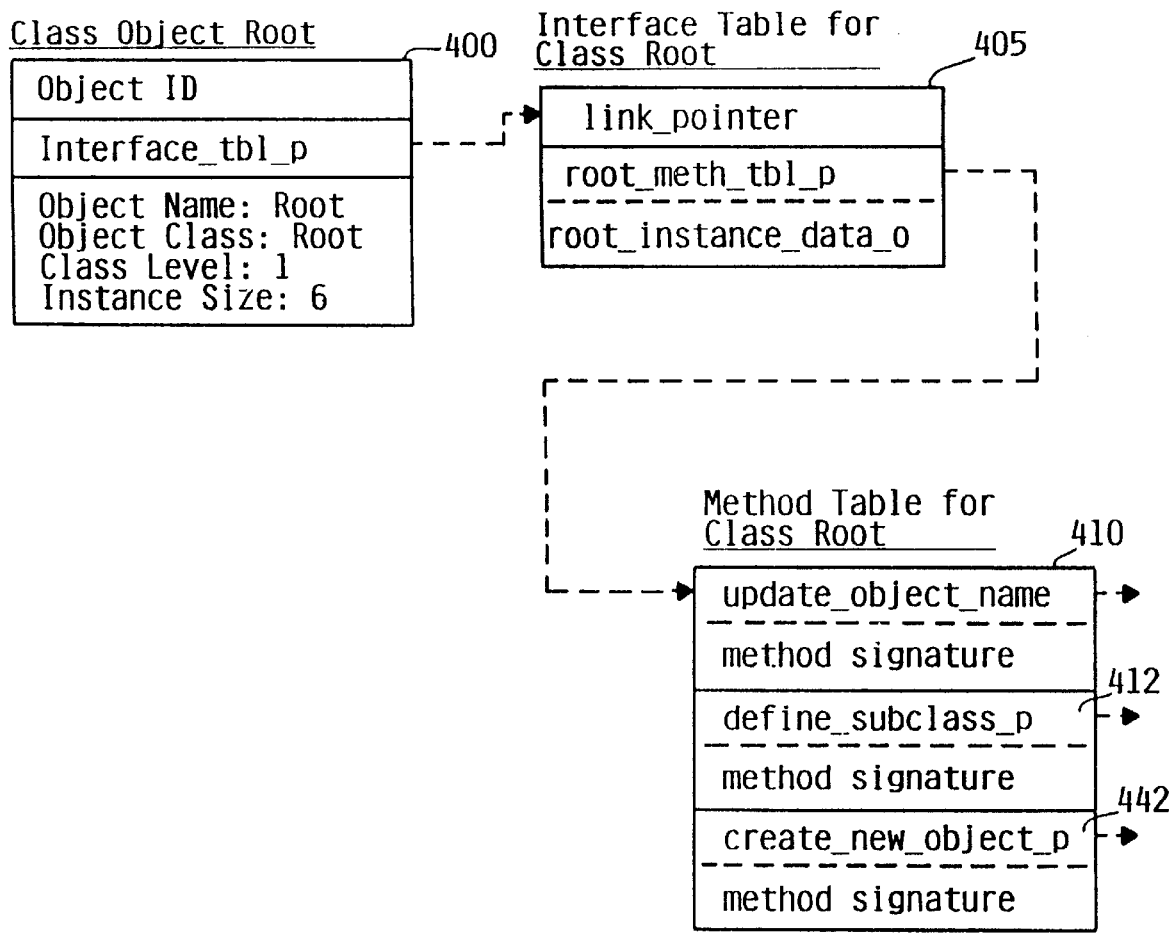
FIGS. 4A through 4E, in combination with FIGS. 3A through 3C, show how the data structures that make up the MOM environment are actually created and represented in storage.
Figure 4B:
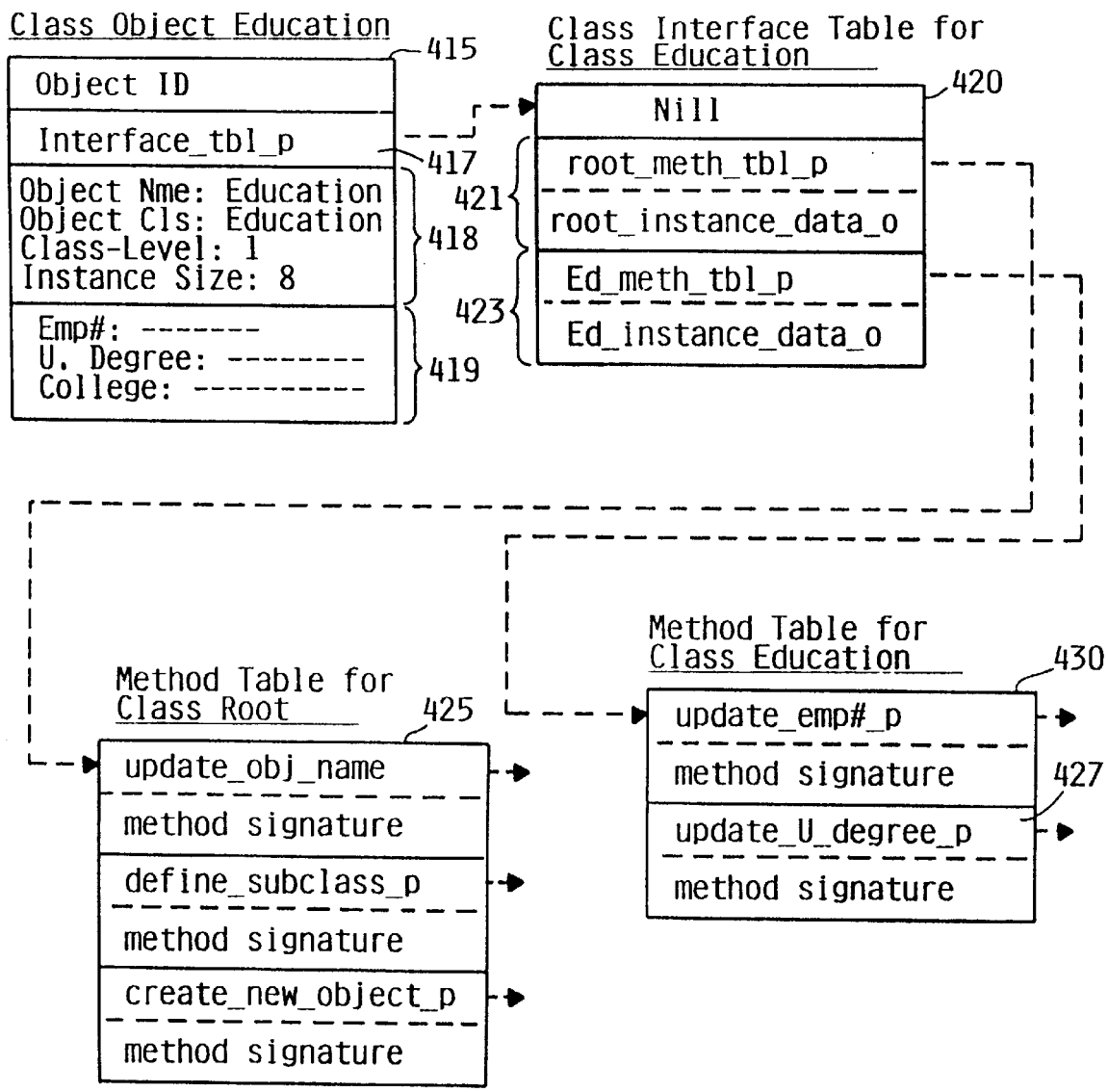
Figure 4C:
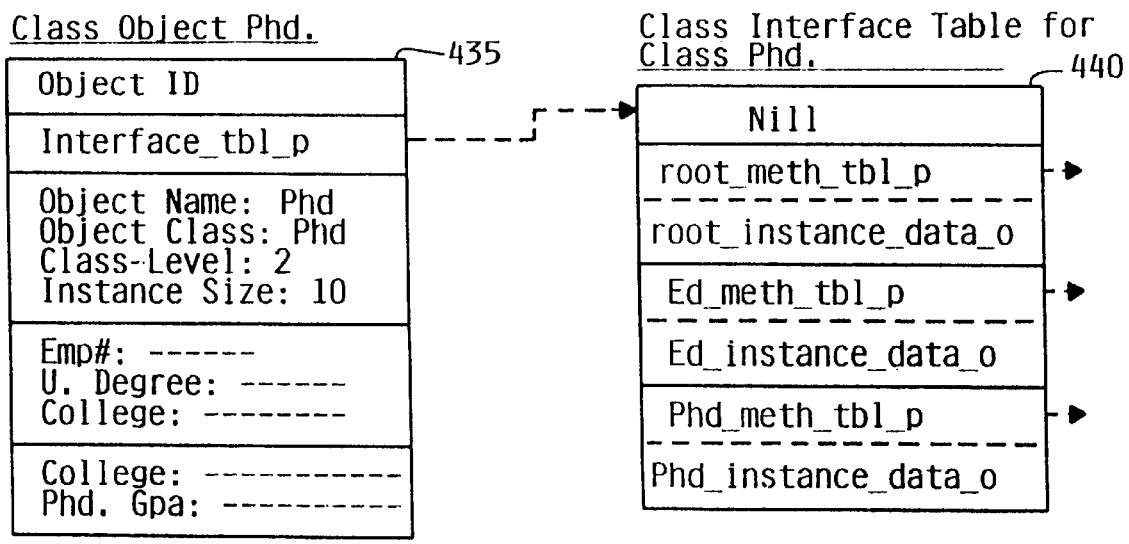
Figure 4C:
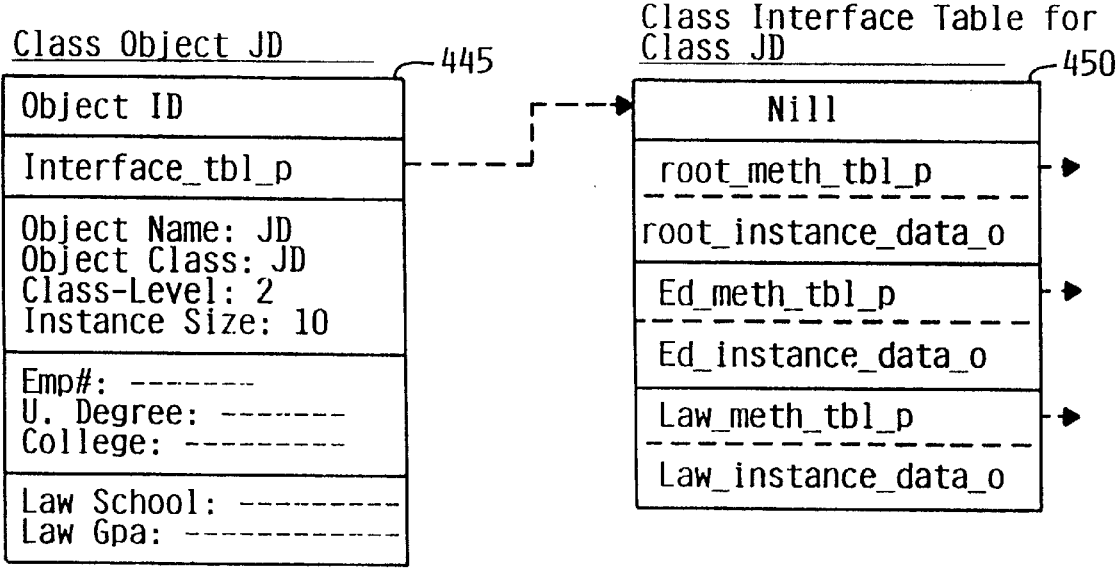
Figure 4D:
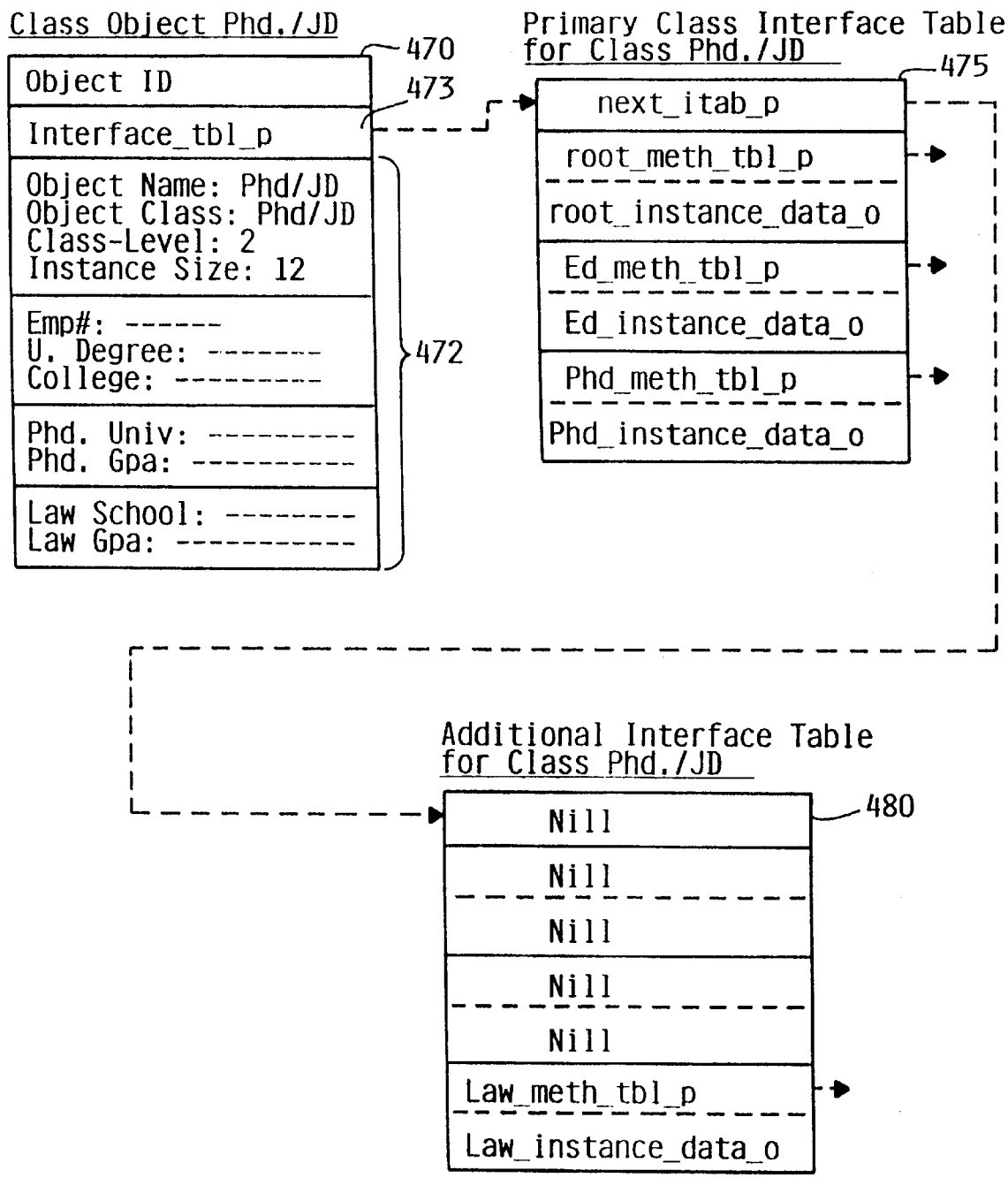
Figure 4E:
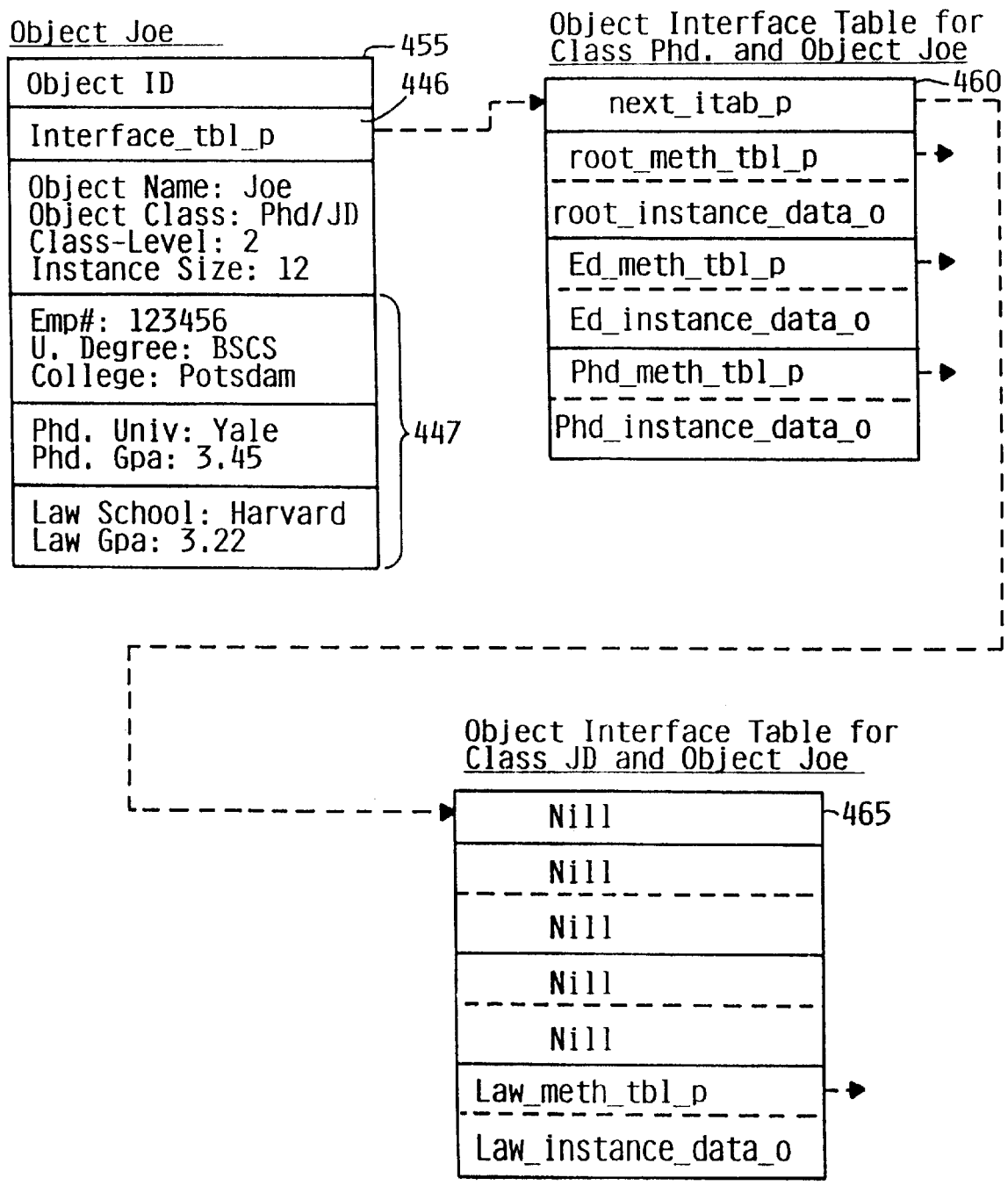

FIG. 3B is a flow diagram of the inner workings 11 of system object manager 115. System object manager 115 will first create an object 360. In this example, object instance 455 (Joe) will be created (shown on FIG. 4E). The user will next be prompted to enter the object name 362, class and level 364, and values for the object instance variables 366. The values are shown at 447 on FIG. 4D. System object manager 115 will then write this information into object 455 (block 368). Object 445 will then be linked to interface table 460 (i.e., the interface table for class PhD/JD) via interface_tbl_p 446 (block 370). Client programs that wish to manipulate the data associated with the employee "Joe" may now call the object instance Joe to do so.

Figure 5:
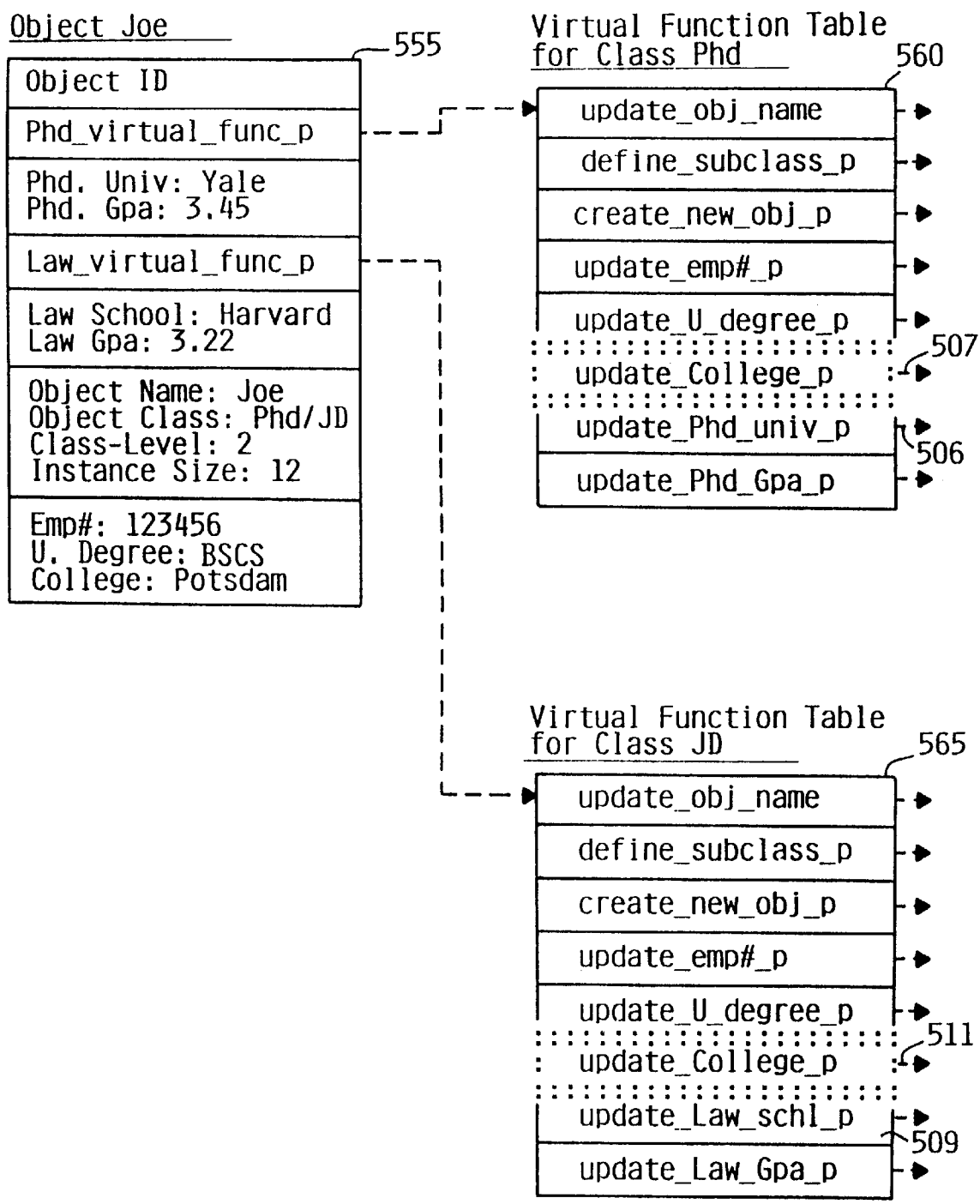
FIG. 5 shows how a method program is added to a C++ object instance that inherits characteristics from more than one class.

FIG. 5 shows the primary composite data structures that are the basis for the C++ OOP environment. Object instance 555 is representative of how the object instance for employee Joe would exist in a C++ environment. Virtual function tables 560 and 565 contain method pointers to the method programs for the classes to which object Joe is a member (i.e., classes Phd and JD) and all the super classes to which classes Phd and JD are subclasses (i.e., super classes Education and Root).

As mentioned in the Background section, the C++ environment is extremely rigid when it becomes necessary to add method programs. Whenever a method program for a particular class of objects is to be added, all of the objects that are members of the changed class and all of the objects that are members of a subclass of the changed class must be recreated and their method programs must be recompiled. Further, all the clients of those objects must also be recompiled. The reason for this rigidity stems from the design of the C++ data structures.

When a client program in a C++ environment routes on an object, it specifies, as part of its call statement, the offset of the entry in the virtual function table that represents the method program that is to be invoked. As shown in FIG. 5, the pointers to the method programs for the entire hierarchy are stacked in virtual function tables 560 and 565. When it becomes necessary to add a method program to a particular class, the method program pointers for the method programs of subclasses of the particular class are all shifted down in the structure (i.e., their offsets change). For example, to add a method program to the class Education, an address of the method program would be inserted at 507 and 511. The pointer to the new method program would then be located at the offset that was formerly occupied by the pointers to the "update Phd university" and "update Law school" method programs (i.e., update_phd_univ_p 506 and update_Law_school_p 509)). The pointers to these method programs are, in turn, shifted down into the location formerly occupied by other pointers.

The effect of this "shifting" is that all the client programs that call objects of class Education would require recompilation (i.e., to understand the existence of the new method) and all the client programs for subclasses of class Education (i.e., Phd and JD) would require recompilation to understand the new offsets of the old method programs.

In many cases, it is easier to simply recompile the entire code base than to attempt to determine which objects and client programs have been effected by an addition of a method program a particular class of objects. Recompilation of this type may take up to twenty four hours to complete.

THE ADVANTAGES OF THE MOM OOP ENVIRONMENT

Figure 6:
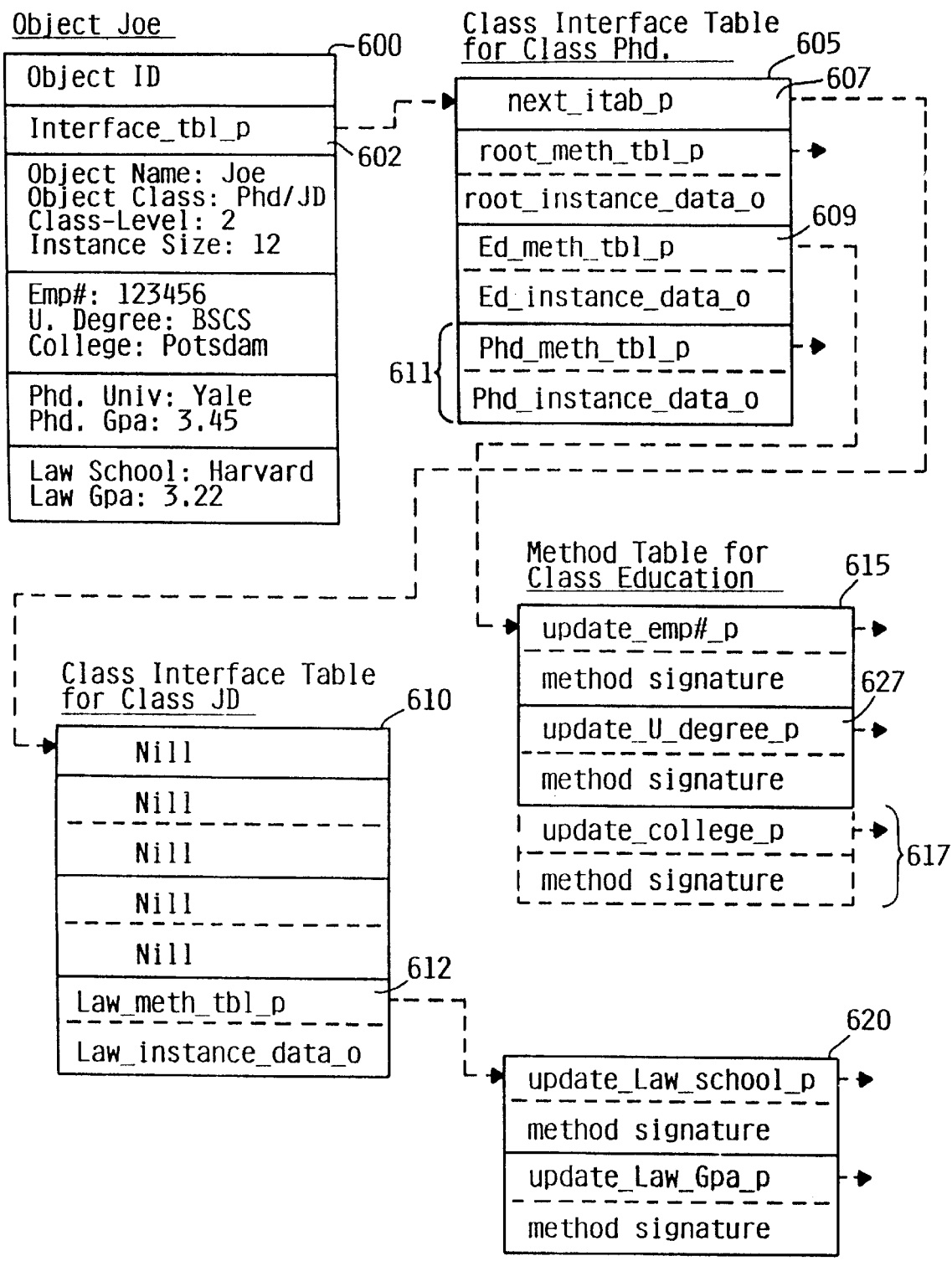
FIG. 6 shows how a method program is added to a MOM object instance that inherits characteristics from more than one class.

FIG. 6 shows the primary composite data structures of the present invention. Object instance 600 is representative of how the object instance for employee Joe will exist in the MOM environment. Unlike the C++ environment, the MOM OOP environment comprises an interface table for class Phd (i.e., interface table 605), and method tables for each class within a hierarchy. FIG. 6 shows only the super class method table for class Education (i.e., method table 615) and the class method table for class JD (i.e., method table 620): The super class method table for class Root and the class method table for class Phd are not shown. Since Joe is a multiple inheritance object, the interface table for class JD (i.e. interface table 610) is also shown on FIG. 6. These differences provide the users of a MOM OOP environment with advantages which are not realized by the users of the C++ OOP environment. As described in the forthcoming paragraphs, the users of the MOM environment do not need to recompile the entire code base to add a method program to a particular class.

ADDITION OF A METHOD PROGRAM TO A MOM CLASS

To illustrate the addition of a method program to a MOM class, assume that, as above, a user wishes to add a method program to class Education. The pointer to the method program would be added to the method table for class Education (i.e., method table 615) at 617. Unlike the C++ environment, there is no shifting involved. Since the pointers to the method programs for classes Phd and JD are located in a different structure (E.g., method table 620), they are not displaced. Hence, client programs that use objects of class Phd/JD would not require recompilation. Only those client programs which need to gain access to the new method program will need to be recompiled.

EFFICIENT METHOD PROGRAM ACCESS

Figure 7A:
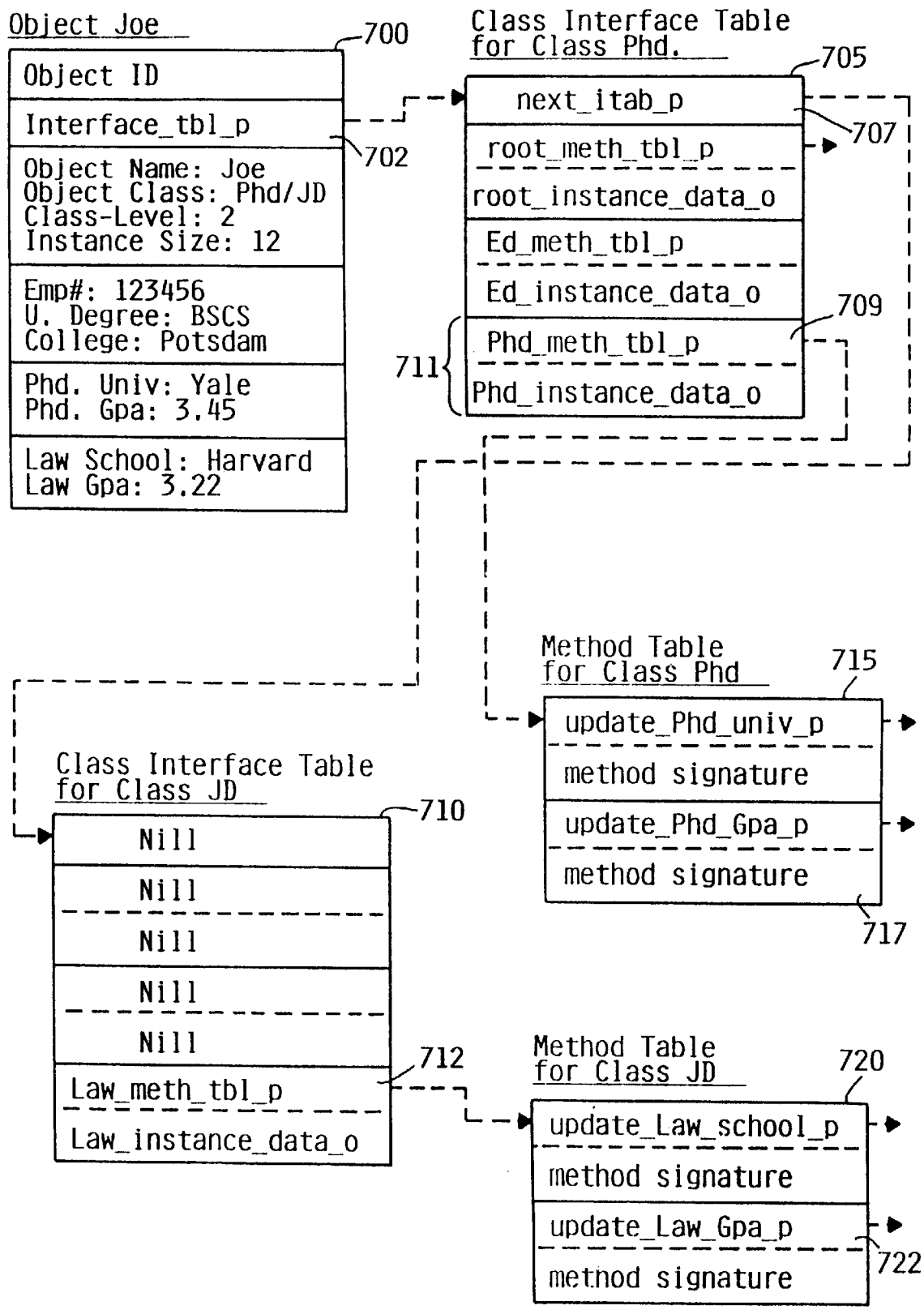
FIG. 7A through 7B show the method routing technique used in the MOM OOP environment.
Figure 7B:
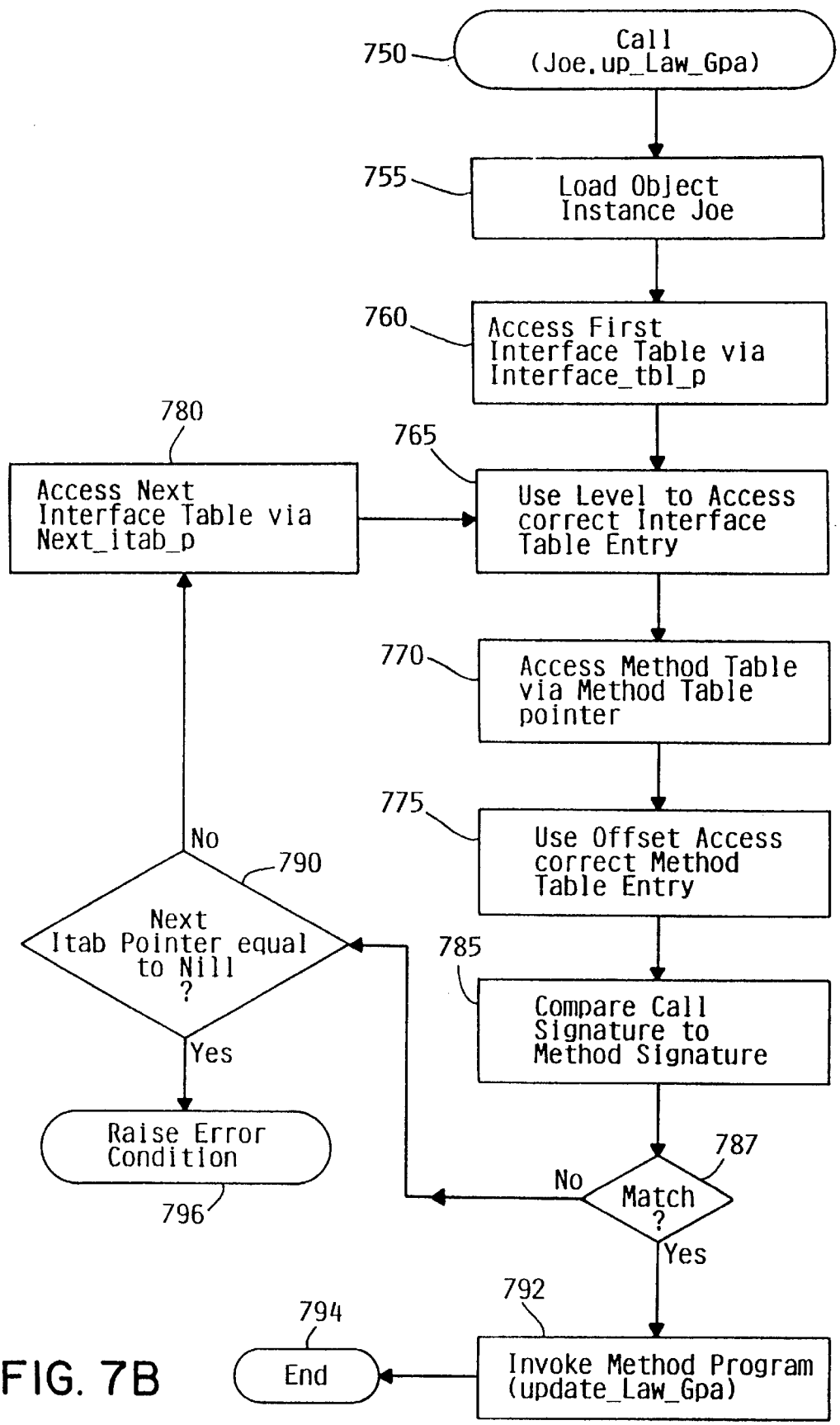

FIGS. 7A and 7B show how a method program of the MOM environment is located when called by a client program. Referring to FIG. 7B, assume that a client program wishes to update the Law Gpa of employee Joe. The client program would have as part of its code a call statement ("Joe.update__Law__Gpa" 750) that allowed it to call the object Joe. When compiled, a MOM call statement comprises: an object ID, a class-level, a class-signature, and a method offset. After executing the call statement, the client program code would load the object instance Joe (object instance 700 on FIG. 7A) 755, load the interface table pointer from the object Joe (interface__tbl__p 702 on FIG. 7A) 760, use the class-level to access the correct interface table entry (i.e., interface table entry 711 as specified by class-level 1) 765.

In block 770, the client program uses Phd__meth__tbl__p 709 to gain access to method table for class Phd (i.e., method table 715) 775 and then uses the method offset to access method signature 717 (block 775) and compare it to the call-signature (block 785). The call and class signatures of the preferred embodiment are constructed using the subject computer system's identification number, the class-level, and a time stamp; however, any means for producing a unique identifier could be used. Since in this example, the client program did not want to gain access to the "update Phd Gpa" method program, the signatures would not match 787. Hence, the client program would ask whether the next interface table pointer was Nill 790 and, if not, proceed to the next interface table 780.

Since in this example the object Joe is a multiple inheritance object, entry 707 will contain the address of interface table 780. At this point, the processing continues as described above. The interface table entry and method table are accessed (blocks 765 and 770) and the call signature is once again compared to the method program signature 785. In this example, the call signature would indeed match the method signature during this iteration 787 and the "update Law Gpa" method program would be invoked 792. The client program can then update the Law Gpa for employee Joe.

In an alternate embodiment, dynamic interface and method table creation takes place whenever an object that requires multiple inheritance is created. Essentially, this is accomplished by moving the multiple inheritance logic (as shown in FIG. 3B) to the object creation stage (as shown in FIG. 3C).

Although a specific embodiment along with an alternate embodiment have been disclosed, it will be understood by those skilled in the art that additional variations in form and detail may be made within the scope of the following claims.

What is claimed is:

1. A computer implemented method for creating and storing a portion of an inheritance graph, said method comprising the steps of:

initiating a mechanism which creates an object instance;

connecting a first interface table to said object instance via location information contained in said object; said first interface table being connected to a second interface table via location information contained in said first interface table such that said object instance is part of a multiple inheritance relationship within said inheritance graph;

said first interface table being connected to a first and a second method table, said first and said second method tables being individually connected to said first interface table via location information contained in said first interface table;

said second interface table being connected to a third method table via location information contained in said second interface table; and storing said object instance in data storage.

2. The method of claim 1 wherein said initiating step further comprises the steps of:

creating instance variables; and placing said instance variables into said object instance.

3. A data storage for storing data for access by at least one computer program, said data storage comprising:

an inheritance graph stored in said data storage, said inheritance graph comprising:

at least one object instance;

first, second, and third method tables, said first, said second and said third method tables each containing location information about method programs; and a first interface table and a second interface table, said first interface table containing location information about said first method table and said second method table, said second interface table containing location information about said third method table, said first interface table being connected to said at least one object instance via location information contained in said at least one object instance, said second interface table being connected to said first interface table via location information contained in said first interface table, said first interface table and said second interface table being connected such that said object instance is part of a multiple inheritance relationship within said inheritance graph.

4. The data storage of claim 3 wherein said at least one object instance further comprises instance variables.

5. The data storage of claim 3 wherein said first, said second and said third method tables further comprise data location means for locating said instance variables.

6. A data storage for storing data for access by at least one computer program, said data storage comprising:

an inheritance graph, said inheritance graph comprising:
  at least one class object;
  first, second, and third method tables, said first, said second and said third method tables each containing location information about method programs; and
  first and second interface tables, said first interface table containing location information about said first method table and said second method table, said second interface table containing location information about said third method table, said first interface table being connected to said class object via location information contained in said at least one class object, said second interface table being connected to said first interface table via location information contained in said first interface table, said first interface table and said second interface table being connected such that said object instance is part of a multiple inheritance relationship within said inheritance graph.

7. The data storage of claim 6 wherein said at least one class object further comprises instance variable definitions.

8. The data storage of claim 7 wherein said first, said second, and said third method tables further comprise data location means for locating said instance variable definitions.

9. A computer implemented method for creating and storing an inheritance graph, said method comprising the steps of:

initiating a mechanism which creates at least one class object;

creating first and second interface tables;

creating first, second, and third method tables;

connecting said first interface table to said at least one class object via location information located in said class object;

connecting said second interface table to said first interface table via location information contained in said first interface table, said first interface table and said second interface table being connected such that said class object is part of a multiple inheritance relationship within said inheritance graph;

connecting said first and said second method tables to said first interface table, said first and said second method tables being individually connected to said first interface table via location information contained in said first interface table;

connecting said third method table to said second interface table, said third method table being connected to said second interface table via location information contained in said second interface table;

connecting method programs to each of said method tables, said method programs being individually connected to said method table via, location information contained in said first, said second, and said third method tables; and storing said at least one class object, said interface tables, and said method tables in data storage.

10. The computer implemented method of claim 9 wherein said initiating step further comprises the steps of:

creating instance variable definitions; and placing said instance variable definitions into said class object.

11. A computer implemented method for invoking a method program for a particular class, said method comprising the steps of:

calling an object, said object beinig part of a multiple inheritance relationship, said calling step being performed via a calling statement, said calling statement comprising an address for said object, a level, a call signature, and a method program offset, said level representing said class to which said call is to be directed and said method program offset representing a method program that is to be invoked;

accessing said object via said object address;

accessing a first interface table via an interface table address stored in said object;

accessing a first method table via a first method table address stored in said first interface table, said first method table address being determined via said level;

accessing a first method signature, said first method signature being accessed via said method program offset;

first determining said first method signature matches said call signature;

accessing a second interface table based on an indication in said first determining step that said first method signature does not match said call signature, said second interface table being accessed via location information contained in said first interface table;

accessing a second method table via a second method table address stored in said second interface table, said second method table address being determined via said level;

accessing a second method signature, said second method signature being accessed via said method program offset;

second determining whether said second method signature matches said call signature;

accessing a method program address based on an indication in said second determining step that said second method signature does match said call signature, said method program address being accessed via said method program offset; and invoking said method program through the use of said method program address.

12. The computer implemented method of claim 11 wherein said invoking step further comprises the step of supplying said method program with said object address and a data offset, said object address and said data offset being used by said method program to access object instance variables stored in said object.

13. A computer apparatus for creating and storing an inheritance graph, said apparatus comprising:

means for initiating a mechanism which creates at least one object instance;

means for connecting a first interface table to said at least one object instance via location information contained in said object;

means for connecting a second interface table to said first interface table via location information contained in said first interface table such that said object instance is part of a multiple inheritance relationship within said inheritance graph;

means for connecting said first and said second method tables to said first interface table, said first and said second method tables being individually connected to said first interface table via location information contained in said first interface table;

means for connecting a third method table to said second interface table, said third method table being connected to said second interface table via location information contained in said second interface table;

means for connecting method programs to each of said method tables, said method programs being individually connected to said method tables via location information contained in said first, said second, and said third method tables; and means for storing said at least one object instance, said interface tables, and said method tables in data storage.

14. The computer apparatus claim 13 wherein said means for initiating further comprise:

means for creating instance variables; and means for placing said instance variables into said object instance.

15. A computer apparatus for creating and storing an inheritance graph, said apparatus comprising:

means for initiating a mechanism which creates at least one class object;

means for creating first and second interface tables;

means for creating first, second, and third method tables;

means for connecting said first interface table to said at least one class object via location information contained in said class object;

means for connecting said second interface table to said first interface table via location information contained in said first interface table such that said class object is part of a multiple inheritance relationship within said inheritance graph;

means for connecting said first and said second method tables to said first interface table, said first and said second method tables being individually connected to said first interface table via location information contained in said first interface table;

means for connecting said third method table to said second interface table, said third method table being connected to said second interface table via location information contained in said second interface table;

means for connecting method programs to each of said method tables, said method programs being individually connected to said method table via, location information contained in said first, said second, and said third method tables; and means for storing said at least one class object, said interface tables, and said method tables in data storage.

16. The computer apparatus of claim 15 wherein said means for initiating further comprises:

means for creating instance variable definitions; and means for placing said instance variable definitions into said class object.

17. A computer apparatus for invoking a method program for a particular class, said apparatus comprising:

means for calling an object, said object being part of a multiple inheritance relationship, said means for calling an object comprising a calling statement, said calling statement comprising an address for said object, a level, a call signature, and a method program offset, said level representing said class to which said call is to be directed and said method program offset representing a method program that is to be invoked;

means for accessing said object via said object address;

means for accessing a first interface table via an interface table address stored in said object;

means for accessing a first method table via a first method table address stored in said first interface table, said first method table address being determined via said level;

means for accessing a first method signature, said first method signature being accessed via said method program offset;

first determining means for determining whether said first method signature matches said call signature;

means for accessing a second interface table based on an indication by said first determining that said first method signature does not match said call signature, said second interface table being accessed via location information contained in said first interface table;

means for accessing a second method table via a second method table address stored in said second interface table, said second method table address being determined via said level;

means for accessing a second method signature, said second method signature being accessed via said method program offset;

second determining means for determining whether said second method signature matches said call signature;

means for accessing a method program address based on an indication by said second determining means that said second method signature does match said call signature, said method program address being accessed via said method program offset; and means for invoking said method program through the use of said method program address.

18. The computer apparatus of claim 17 wherein said means for invoking further comprises means for supplying said method program with said object address and a data offset, said object address and said data offset being used by said method program to access object instance variables stored in said object.

* * * * *